April 11, 1961 A. SIFRIN ET AL 2,979,000
CYCLONE FURNACE UNIT AND METHOD OF OPERATING THE SAME
Filed Jan. 25, 1955
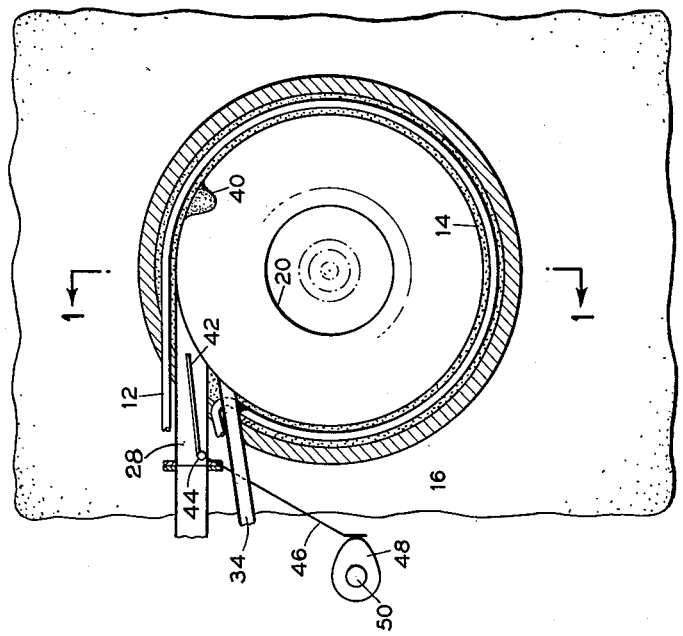
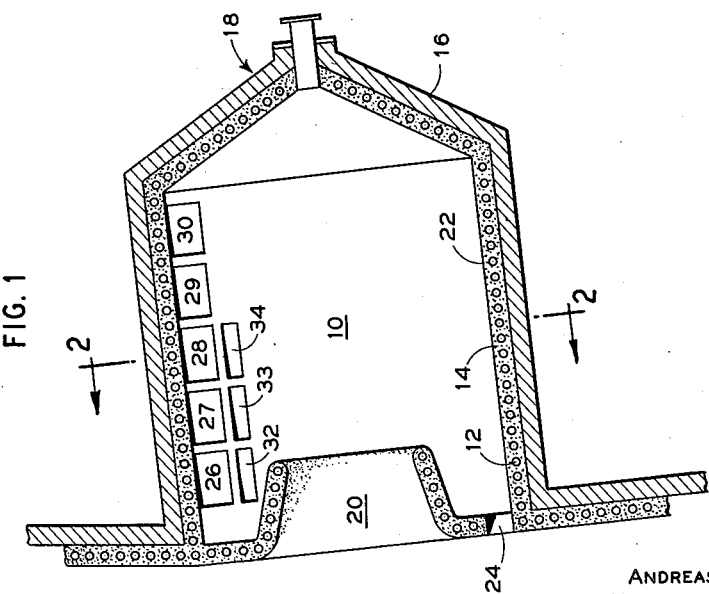
ANDREAS SIFRIN
HERMANN HENNECKE
INVENTOR
BY *M. Holbrook*
ATTORNEY

United States Patent Office 2,979,000
Patented Apr. 11, 1961

2,979,000
CYCLONE FURNACE UNIT AND METHOD OF OPERATING THE SAME

Andreas Sifrin and Hermann Hennecke, Oberhausen, Germany, assignors to The Babcock & Wilcox Company, New York, N.Y., a corporation of New Jersey Filed Jan. 25, 1955, Ser. No. 483,902

Claims priority, application Germany Feb. 16, 1954

5 Claims. (Cl. 110—28)

This invention relates to the burning of a slag forming fuel in a combustion zone defined by fluid cooled walls. The invention is more particularly concerned with the removal of slag accumulations adjacent the zone of entry of secondary air into the combustion zone, such accumulations being caused by the effecting of combustion at temperatures above the fusion temperature of the slag in the fuel, and by the slag cooling action of a fluid cooled wall of the combustion zone. Such accumulations occur adjacent the zone of entry of secondary air where there is such a concentration of the entering secondary air that, in combination with the other influences, it results in the slag accumulations on the wall.

When such slag accumulations reach a substantial extent they interefere with optimum combustion which involves the lining of the combustion zone with a thin layer of molten or semi-molten slag into which burning fuel particles are projected as a result of the substantially tangential introduction of the fuel particles.

This invention is concerned with means and a method for the removal from the wall of the combustion zone of such obstructive particles of frozen slag. The invention involves controlled and periodic reductions of the amount of secondary air in order that the slag obstructions may have their temperatures increased to such extent that the slag will melt, for subsequent flow from the combustion zone in molten form.

In one of its more specific aspects the invention involves a cyclone furnace for fluid heat exchange appartus, the furnace involving a combustion chamber of circular cross-section, with its walls including fluid conducting wall tubes. One or more streams of primary air mixed with particle form solid fuel enters the combustion chamber tangentially. The combustion chamber also has a second inlet means through which secondary air is introduced in a manner similar to the introduction of the primary air and the fuel. In this combination the invention involves secondary air control means periodically reducing the flow of secondary air when the temperature of slag exiting from the combustion zone falls below a predetermined value.

The invention will be concisely as set forth in the claims appended hereto, but for a more complete understanding of the invention, its uses and advantages, recourse should be had to the following description which refers to a preferred embodiment of the apparatus of the invention, as shown in the accompanying drawings.

In the drawings:

Fig. 1 is a vertical longitudinal section of a cyclone furnace taken on the line 1—1 of Fig. 2; and Fig. 2 is a transverse upright section through the Fig. 1 cyclone furnace on the line 2—2 of Fig. 1.

The cyclone furnace shown in the drawings is of a type generally indicated in the U.S. patent to Kerr et al. 2,594,312 of April 27, 1952. It includes a hollow cylindrical combustion zone or furnace chamber 10, of circular cross-section, having, in its walls, substantially circular formations of vapor generating tubes 12 appropriately connected into fluid circulation of the associated steam generating unit and covered on their furnace sides by high temperature refractory material 14, in a manner indicated by the Kerr patent. The furnace construction includes the stratum of thermal insulating material 16, disposed externally of the tubes 12, and this layer of insulating material may be covered by a pressure tight sheet metal casing.

The end wall 18 of the furnace is of similar construction, as is also the opposite end of the furnace which includes an arrangement of the fluid conducting tubes and associated refractory material to form the gas outlet throat 20 of the furnace. The furnace is preferably operated by the burning of a slag forming fuel at temperatures above the fusion temperature of the slag, and with the horizontal inclined furnace arrangement illustrated, the molten slag runs down the bottom 22 of the furnace and exits through the opening 24, from which it flows by appropriate means to a slag pit for continuous removal.

Secondary air is introduced into the cyclone furnace chamber at high velocity and in controllable amounts through the nozzles 26–30, and streams of primary air and particle form slag forming fuel are introduced into the cyclone in a substantially tangential manner through the nozzles 32–34. As shown, the horizontally elongated secondary air nozzles 26–30 are horizontally arranged at points spaced along substantially the entire length of the cylindrical section of the furnace and substantially tangential to the inside wall surface of the furnace at the upper side thereof. The primary air-fuel nozzles 32, 33, 34 are horizontally elongated and arranged at an inclination below the secondary air nozzles, each nozzle 32, 33 and 34 being coextensive with a corresponding secondary air nozzle 26, 27 and 28 respectively. The axis of discharge of each fuel nozzle intersects the inside circumferential wall of the cyclone furnace at a point spaced clockwise of the discharge end of the corresponding secondary air nozzle. With this arrangement the entering secondary air streams sweep along the inside wall surfaces of the cyclone furnace in a helical flow path, while the entering primary air-fuel streams initially impact on the inside wall at points spaced clockwise of the entrance of the secondary air streams.

In the normal operation of the cyclone furnace the walls of the furnace become lined with a semi-molten layer of slag, maintained in such condition by the high temperature operation of the furnace. Into this high temperature or semi-molten layer of slag the burning fuel particles are projected by the incoming streams. Some of these particles stick in the slag lining of the furnace and are swept on all sides by the combustion supporting secondary air to promote optimum combustion of the fuel. Simultaneously with these actions the streams of air and fuel, and the resulting streams of combustion gases not only pass in a substantially circular path around the furnace wall, but they also pass in a helical path toward the gas outlet 20 of the furnace.

Experience with the operation of furnaces in the above described manner indicates that, in a zone which may be said to be immediately in front of the secondary air nozzles 26–28, i.e. where the axes of the primary air-fuel nozzles 32–34 intersect the chamber wall, the temperature is such that there occur accumulations of frozen slag on the furnace wall. The position of such accumulations is indicated at 40 in Fig. 2 of the drawing. When such accumulations gather to any such extent as that indicated, they interfere with the optimum operation of the furnace and deflect the flame from its optimum sweeping action along the wall of the cyclone.

For the purpose of removing such frozen slag accumulations as those indicated at 40 in Fig. 2 of the drawing, this invention involves a periodic and temporary reduction of the secondary air flow in order that the zone of accumulation may reach such a temperature that the slag in the accumulation melts and exits from the furnace in a normal manner. For this purpose each one of the secondary air nozzles is provided with a valve or damper 42 fixed to a pintle 44 turnably mounted in the nozzle. This pintle also has fixed thereto an arm 46, the lower end of which contacts a cam 48 fixed to a rotating shaft 50, driven by a suitable electric motor (not shown). The lower end of the arm 46 may be held by any suitable means against the surface of the cam 48.

There may be a damper or valve 42, with its associated elements provided for each one of the secondary air nozzles 26–28, with each valve or damper operating arm, similar to the arm 46, contacted by its own, or a separate cam on the shaft 50. Successive cams, fixed to the shaft 50 may be set at radially spaced positions so that the reductions of secondary air flow in the nozzles 26–28 take place in a successive manner. The reduction in secondary air flow by each damper is preferably of short duration, and, preferably each damper is returned to its previous or normal condition before the succeeding damper is operated to effect its reduction in secondary air flow. This manner of operation has the advantage that it involves a minimum reduction in the overall flow of secondary air so that the objectionable accumulations of slag, such as accumulation 40 may be removed with a minimum of interference with optimum combustion.

The temperature of the molten slag flowing from the outlet 24 may be measured by means of a radiation pyrometer, and when this temperature drops below a predetermined value, as, for example, 1350° C., the rotation of the cam shaft 50 may be started by the manual or automatic initiation of the operation of the electric motor for driving that shaft. When the predetermined slag temperature is exceeded an oppositely directed impulse may terminate the operation of the electric motor and stop the operation of the cams and their associated means for reducing the flow of secondary air.

In conjunction with this apparatus, means are preferably provided so that the cams have their movement stopped when the cams are in such position that the valves or dampers 42 of the respective secondary air nozzles are located in such positions that the secondary air may flow in a normal manner into the cyclone.

The invention also has, within its purview, a method similar to that described above, in which the shaft and its associated mechanism for successively reducing the flow of secondary air in the different secondary air nozzles, may be operated continuously throughout the operation of the furnace, the use of this method depending on a number of factors, such as the extent and frequency of the frozen slag accumulations 40.

Whereas the invention has been described with reference to the details of particular embodiments or modifications thereof, it is to be understood that such disclosure is by way of example only and not by way of limitation. The scope of the invention is rather to be taken as of a scope commensurate with the sub-joined claims.

What is claimed is:

1. In a cyclone furnace for burning a slag forming fuel at temperatures above the fusion temperature of the ash or slag in the fuel, means including fluid conducting wall tubes forming a combustion chamber of circular cross section, a plurality of secondary air inlet means extending through the circumferential wall of the combustion chamber to form secondary air inlet ports along a line parallel with the longitudinal axis of the combustion chamber, a row of other inlets or nozzles circumferentially spaced and aligned with the row of secondary air inlets and similarly leading through the circumferential wall of the combustion chamber to conduct streams of primary air and particle form slag forming fuel into the combustion chamber in converging relationship to the streams of the secondary air, secondary air control means including separately operable dampers or valves in the respective secondary air inlets, and means operating said valves or dampers in succession to periodically shut off or reduce the flow of secondary air through the separate secondary air inlets, without correspondingly reducing the corresponding primary air-fuel streams, to melt down frozen slag accumulations on the combustion chamber wall in front of said inlets.

2. In a cyclone furnace, wall means including closely arranged fluid conducting tubes and presenting a combustion chamber of generally hollow cylindrical configuration, said wall means forming an outlet for combustion products at one end of the combustion chamber, first inlet means including a plurality of substantially tangential primary air and fuel inlets extending through the circumferential wall of the combustion chamber and arranged in succession along that wall, mixtures of primary air and particle form slag forming solid fuel normally passing through said inlets for subsequent circular and helical movements of burning fuel within the combustion chamber and toward said outlet, second inlet means including a plurality of substantially tangential secondary air inlets arranged in succession along the circumferential wall of the combustion chamber, each inlet of the second inlet means being circumferentially aligned and downstream of one of the inlets of the first inlet means and relative to the direction of the circular movement of the gases within the combustion chamber to interpose relative to each stream of primary air and fuel mixture and an adjacent portion of the combustion chamber wall a stratum of secondary air, independently operable dampers in the separate inlets of the second inlet means, damper operating means including successively operative elements for successively changing the position of each damper to reduce its secondary air flow, without correspondingly reducing the corresponding primary air-fuel streams, and then restoring the changed damper to its previous position, to thereby melt off frozen slag accumulations on the combustion chamber wall in front of the second inlets with a minimum disturbance of optimum combustion conditions within the combustion chamber, and a molten slag outlet at the combustion chamber wall and adjacent said first mentioned outlet.

3. In a cyclone furnace, wall means including closely arranged fluid conducting tubes and presenting a combustion chamber of generally hollow cylindrical configuration, said wall means forming an outlet for combustion products at one end of the combustion chamber, first inlet means including a plurality of substantially tangential primary air and fuel inlets extending through the circumferential wall of the combustion chamber and arranged in succession along that wall toward said outlet, mixtures of primary air and particle form slag forming solid fuel normally passing through said inlets for subsequent circular and helical movements of burning fuel and combustion gases within the combustion chamber and toward said outlet, second inlet means including a plurality of substantially tangential secondary air inlets arranged in succession along the circumferential wall of the combustion chamber toward said outlet and circumferentially aligned with corresponding primary air and fuel inlets, independently operable dampers in the separate inlets of the second inlet means, damper operating means including successively operative elements for successively changing the position of each damper to reduce its secondary air flow, without correspondingly reducing the corresponding primary air-fuel streams, and then restoring the changed damper to its previous position, to thereby melt off frozen slag accumulations on the combustion chamber wall in front of the second inlets with a minimum disturbance of optimum combustion conditions within the combustion chamber, and a molten slag outlet at the combustion chamber wall and adjacent said first mentioned outlet.

4. The method of operating a cyclone furnace having a furnace chamber of substantially circular transverse cross-section arranged with its longitudinal axis substantially horizontal and defined by fluid cooled walls having an inner exposed refractory surface and a molten slag discharge outlet in the lower part thereof which comprises introducing primary air and particle form slag-forming fuel in suspension into said furnace chamber in separate longitudinally spaced streams through the circumferential wall thereof initially impinging on that wall at points circumferentially spaced from the points of entry and effecting a helical path of travel of said streams along the circumferential wall of the furnace chamber, introducing streams of secondary air into said furnace chamber substantially tangential to the circumferential wall thereof at points circumferentially downstream of the primary air-fuel inlet ports a distance less than the point of initial impingement of the corresponding fuel stream on the circumferential wall and in corcumferential alignment therewith, burning the fuel under a mean furnace temperature above the slag fusion temperature while passing through the helical flow path to provide a layer of fused slag on the walls of the furnace chamber, and selectively reducing the volume of the secondary air streams, without correspondingly reducing the corresponding primary air-fuel streams, to increase the combustion temperature of the corresponding primary air-fuel stream at its point of initial impingement on the circumferential wall and melt any slag accumulation at that point.

5. The method of operating a cyclone furnace having a furnace chamber of substantially circular transverse cross-section arranged with its longitudinal axis substantially horizontal and defined by fluid cooled walls having an inner exposed refractory surface and a molten slag discharge outlet in the lower part thereof which comprises introducing primary air and particle form slag-forming fuel in suspension into said furnace chamber in separate longitudinally spaced streams through the circumferential wall thereof initially impinging on that wall at points circumferentially spaced from the points of entry and effecting a helical path of travel of said streams along the circumferential wall of the furnace chamber, introducing streams of secondary air into said furnace chamber substantially tangential to the circumferential wall thereof at points circumferentially downstream of the primary air-fuel inlet ports a distance less than the point of initial impingement of the corresponding fuel stream on the circumferential wall and in corcumferential alignment therewith, burning the fuel under a mean furnace temperature above the slag fusion temperature while passing through the helical flow path to provide a layer of fused slag on the walls of the furnace chamber, selectively controlling the volume of the individual secondary air streams, without correspondingly changing the corresponding primary air-fuel streams, to vary the combustion temperature of the corresponding primary air-fuel stream at its point of initial impingement on the circumferential wall and control any slag accumulation at that point, and regulating the secondary air control in response to the temperature of the slag leaving the furnace chamber.

References Cited in the file of this patent

UNITED STATES PATENTS

| | | |
|---|---|---|
| 1,452,045 | Hawley | Apr. 17, 1923 |
| 1,670,276 | Worthington | May 15, 1928 |
| 1,866,404 | Frisch et al. | July 5, 1932 |
| 2,476,507 | Parmele | July 19, 1949 |
| 2,594,312 | Kerr et al. | Apr. 29, 1952 |

FOREIGN PATENTS

| | | |
|---|---|---|
| 525,424 | Belgium | Jan. 15, 1954 |